United States Patent [19]

Wix

[11] Patent Number: 4,552,494
[45] Date of Patent: Nov. 12, 1985

[54] SAFETY SHIELD FOR DRILL PRESS

[76] Inventor: Douglas R. Wix, Rte. 2, Box 286, Westmoreland, Tenn. 37186

[21] Appl. No.: 610,151

[22] Filed: May 14, 1984

[51] Int. Cl.$^4$ .................... B23B 47/34; B23Q 11/08
[52] U.S. Cl. ............................ 408/67; 29/DIG. 56; 74/609; 74/612; 144/251 A; 408/241 G; 409/134
[58] Field of Search .................. 408/241 G, 72 B, 67, 408/710, 241 B; 409/134; 144/251 A; 51/272; 29/DIG. 50, DIG. 56, DIG. 94; 74/609, 612

[56] References Cited

U.S. PATENT DOCUMENTS

| 1,058,149 | 4/1913 | Campbell | 408/710 |
| 1,563,887 | 12/1925 | Wiespetat | 408/241 G |
| 3,704,959 | 12/1972 | John | 408/710 |
| 3,787,138 | 1/1974 | Vernon et al. | 408/241 G |
| 4,132,497 | 1/1979 | Weller et al. | 408/241 G |
| 4,290,717 | 9/1981 | Aslen | 408/241 G |

FOREIGN PATENT DOCUMENTS 922205 6/1947 France ............... 408/241 G

Primary Examiner—Z. R. Bilinsky
Attorney, Agent, or Firm—Richard L. Caslin

[57] ABSTRACT

This safety shield is collapsible and for use with a vertical drill press to protect the press operator from injury. The shield includes a pair of interconnected telescoping hollow cylinders, with the top cylinder of elongated shape that is mounted to a non-rotating, vertically movable drill housing member, while the lower cylinder is also of elongated shape and it is suspended from the top cylinder and is capable of telescoping with respect to the top cylinder. The top end of the top cylinder has a novel adjustable clamping collar so the collar may expand and contract, and fastening means are used for tightening and loosening the collar with respect to the drill housing member. The lower cylinder of the shield is also fitted with an enlarged collar adjacent its top end of about the same size as the adjustable collar of the top cylinder. A vertical pair of opposed tubular bearings are mounted on the upper collar, and an aligned pair of vertical tubular bearings are mounted on the lower collar, and a vertical elongated slide pin is mounted between the aligned bearings of both collars. The lower end of the slide pin is fixed with respect to the lower collar of the lower cylinder. One side of the lower cylinder is removed for gaining ready access to the interior thereof for adjusting the drill chuck and replacing the drill bits. The bottom of the lower cylinder is closed by a wall that is furnished with a central opening supporting a downwardly projecting tubular drill guide.

4 Claims, 5 Drawing Figures

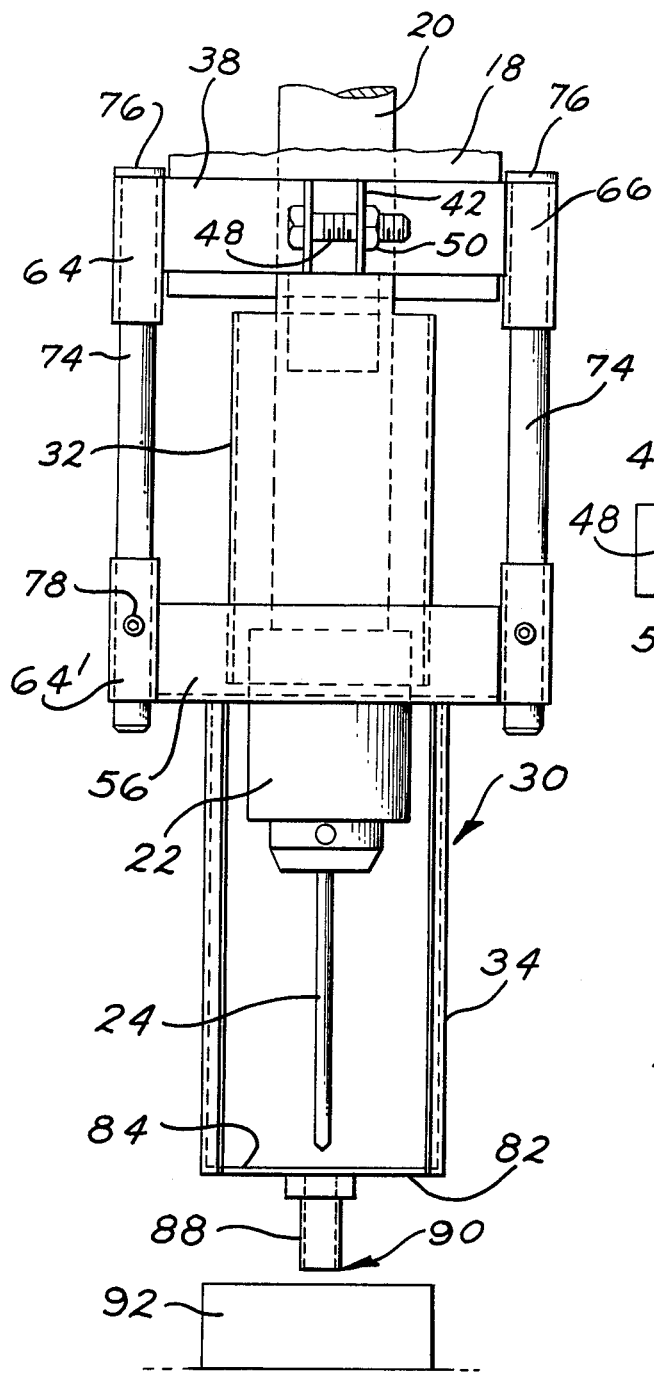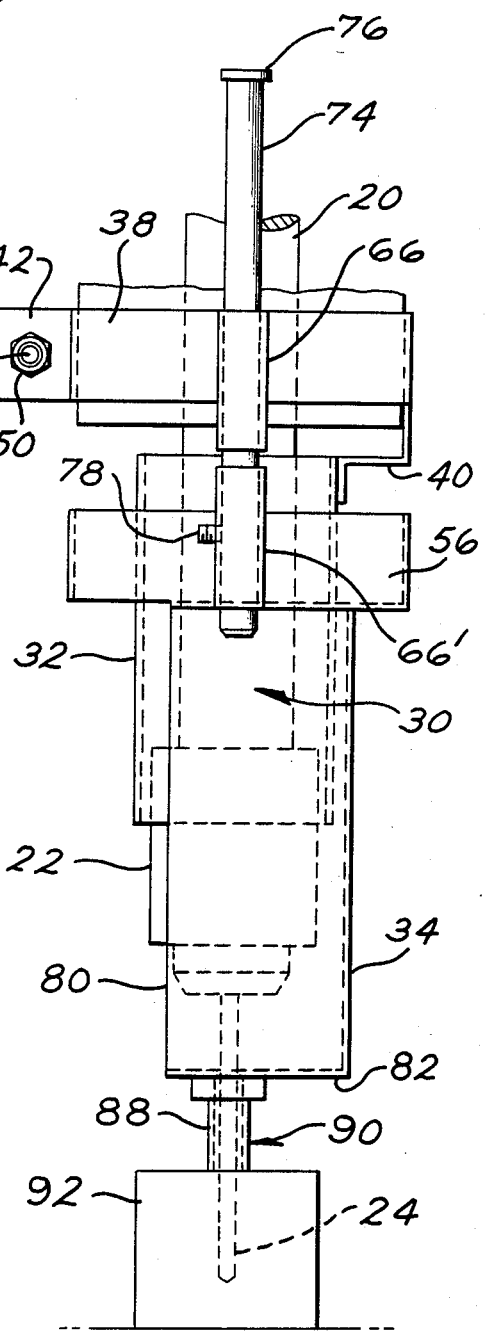

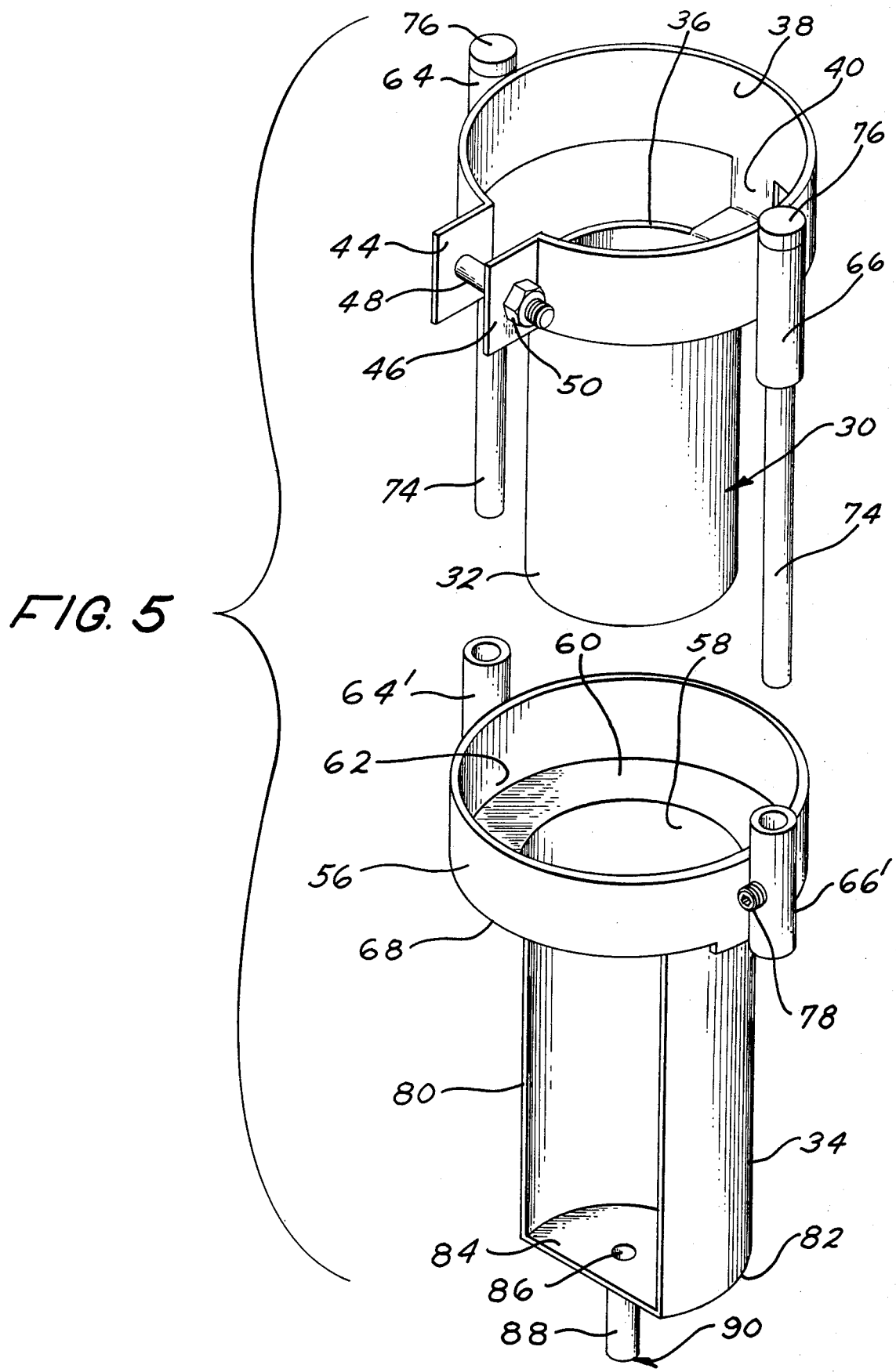

4,552,494

SAFETY SHIELD FOR DRILL PRESS

BACKGROUND OF THE INVENTION

1. Field of the Invention

This invention relates to a collapsible safety shield for protecting a drill press operator from being injured by the rotating drill bit or the rotating chuck that supports the drill bit or from metal shavings coming from the workpiece or danger of the operator's hair or clothing from being pulled into the rotating equipment.

2. Description of the Prior Art

The Vernon et al U.S. Pat. No. 3,787,138 shows a safety guard for use in mounting to the drill housing of a drill press. This guard is a hollow, transparent plastic cylinder which is of a height sufficient to extend between the non-rotatable drill housing and to extend below the rotating drill chuck but the drill bit supported in the chuck is completely exposed. This transparent safety guard only protects the drill press operator from involvement with the rotating chuck and not from protection from the rotating drill bit.

The Weller et al U.S. Pat. No. 4,132,497 describes four modifications of a guard for protecting a drilling machine operator from a drill bit mounted in a vertical drilling machine. The guard of this patent has a split ring at the top to be clamped to a non-rotating spindle of the drill press. Extending downwardly from this split ring is a vertical slide arrangement that supports a pair of transparent plastic half-shields so as to allow the operator to see the action of the drill bit during drilling. This patent has several modifications of vertically movable arrangements between the upper split ring and the lower half-shields. The design of this Weller patent has no means across the bottom wall of the shields for protecting against the turning action of the drill bit.

The Aslen U.S. Pat. No. 4,290,717 describes a collapsible safety guard for application to the barrel of a vertical drilling machine. There is a guard body clamped to the barrel of the drilling machine, and a guard sleeve or skirt that depends from the guard body, and the sleeve is provided with a plurality of apertures fitted with clear-view panels, while the apertures are separated by a longitudinal breaker bar to break off slivers of metal cut from the workpiece so as to reduce the scoring of the transparent panels. The guard sleeve is held on the guard body by engagement of slide pins with inclined slot formations.

The John U.S. Pat. No. 3,704,959 describes a retractable guard for an axially movable cutting tool spindle of a machine tool. There is a stainless steel strip in the form of a telescopic, collapsible guard so that axial movement of the drill bit will vary the amount of overlap of the turns of the helical spiral strip.

The Campbell U.S. Pat. No. 1,058,149 relates to a safety attachment for high-speed drills that is adapted to prevent breakage of the drill bit when the drill passes through the workpiece or into a blow-hole. This patent does not relate to a safety guard for protecting the hands of an operator of a drill press from coming into contact with a drill bit.

The Wiespetat U.S. Pat. No. 1,563,887 relates to a safety guard comprising a single cylindrical shield that is suspended by a single strap from the rack feed of the drill press to prevent contact with the rotating chuck, but it does not protect the operator from contacting the drill bit.

OBJECTS OF THE PRESENT INVENTION

The principal object of the present invention is to provide a gravity-fed, collapsible safety shield for use with a vertical drill press for protecting the hands of an operator from injury as well as preventing any of the metal shavings from being thrown outward during the drilling operation.

A further object of the present invention is to provide a collapsible safety shield of the class described having a pair of interconnected telescoping hollow cylinders, where the top cylinder member is adjustably mounted to a non-rotating, vertically movable drill housing member, while the lower cylinder is movably suspended from the top cylinder member and is open at the rear for gaining access to the chuck and drill bit when the machine is turned OFF.

A still further object of the present invention is to provide a collapsible safety shield of the class described with novel vertical slide pins for interconnecting the top and bottom telescoping cylinders.

A further object of the present invention is to provide the lower cylinder with a closed bottom wall that includes a downwardly projecting tubular drill guide.

SUMMARY OF THE INVENTION

The present invention provides a collapsible safety shield for protecting an operator of a vertical drill press, where the shield has two interconnected telescoping hollow cylinders that are adapted to expand and contract in a vertical direction. The top cylinder is adjustably mounted to a non-rotating, vertically movable drill housing member, while the lower cylinder is suspended from the top cylinder by a pair of elongated slide pins that are fixed to one cylinder and capable of moving with respect to the other cylinder. The lower cylinder is open at the back wall for gaining access to the drill chuck and the drill bit that are both positioned within the safety shield. The bottom of the lower cylinder is closed by a wall that is furnished with a central opening supporting a downwardly projecting tubular drill guide for the drill bit.

BRIEF DESCRIPTION OF THE DRAWINGS

FIG. 3 is a rear elevational view of the safety shield of the present invention mounted to a non-rotating, vertically movable drill housing member, and taken on the line 3—3 of FIG. 2, and showing the open rear wall of the lower cylinder for gaining access to the drill chuck and the drill bit.

FIG. 4 is a right side elevational view similar to that of FIG. 2, except the drill press spindle has been lowered so the drill bit may enter the workpiece and do the job intended, while the lower cylinder is shown collapsed over the upper cylinder.

FIG. 5 is a vertically exploded perspective view of the collapsible safety shield of the present invention looking at the rear side of the shield for understanding its details of construction.

DESCRIPTION OF THE PREFERRED EMBODIMENT

Figure 1:
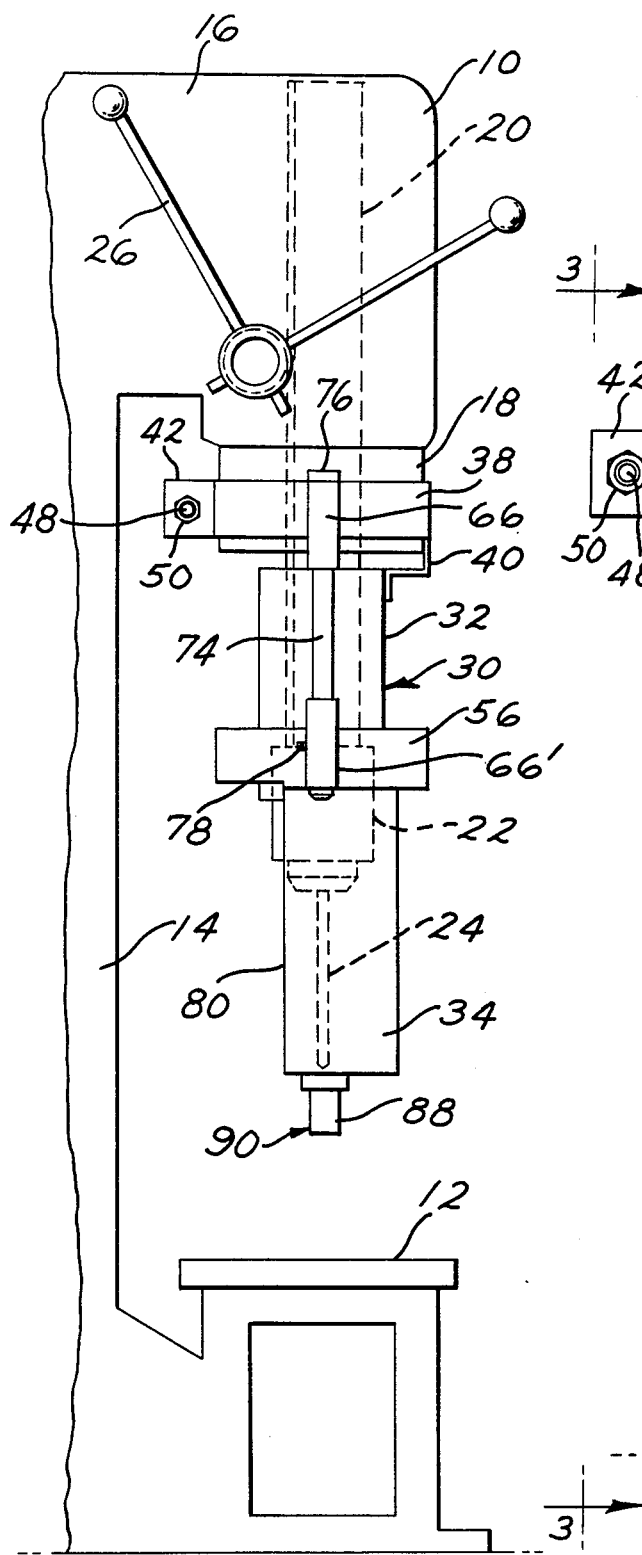
FIG. 1 is a right side elevational view of a vertical drill press furnished with the collapsible safety shield embodying the present invention, with the lower cylinder of the shield being in its lowest position measured from the upper cylinder.

Turning now to a consideration of the drawings and in particular to the right side elevational view of FIG. 1, there is shown an industrial drill press of generally standard construction having a bench 12 for supporting a vise (not shown) for holding a workpiece that is to be acted upon by the drill bit of this press. This is a vertical drill press having a vertical frame 14 and a drill head 16 mounted directly above the bench 12. The drill head supports a non-rotating, vertically movable drill housing 18 which internally supports a rotating spindle 20 that carries on its lower end a drill chuck 22 in which a drill bit 24 may be clamped. Not shown with this drill press is the motor and drive train for turning the spindle 20 at a high speed so that the drill bit will serve its usual functions. A large handwheel 26 is mounted on the right side of the drill press 10 for use by the operator in raising and lowering the vertically movable drill housing 18 which in turn raises and lowers the spindle 20 with its drill bit 24, as is standard in this art.

Incorporated with this drill press 10 is a collapsible safety shield 30 for protecting the operator from accidental engagement with the drill bit 24 or the rotating drill chuck 22 of the spindle 22. This safety shield also protects the operator from injury by flying metal shavings that are generated by the drilling action of the drill bit. This safety shield 30 has a pair of interconnected telescoping hollow cylinders 32 and 34. The top cylinder is 32 and the lower cylinder is 34. Both cylinders 32 and 34 are of vertically elongated shape. The top cylinder 32 is adapted to be mounted to the non-rotating, vertically movable drill housing 18, while the lower cylinder 34 is suspended from the top cylinder, as will best be understood with relation to the exploded perspective view of FIG. 5.

Figure 2:
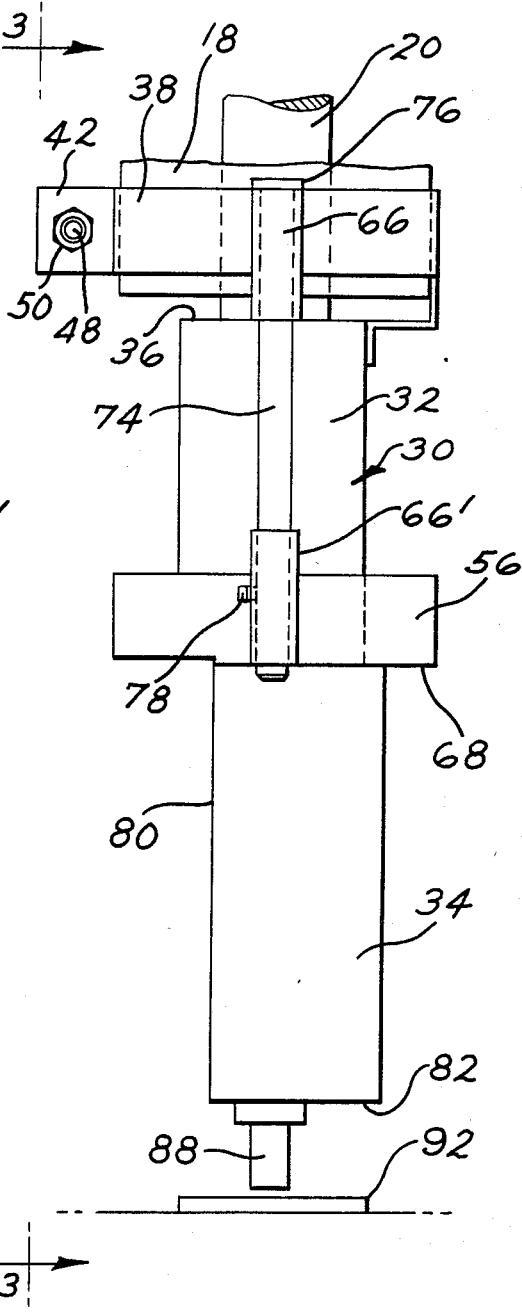
FIG. 2 is an enlarged right side elevational view of the safety shield of FIG. 1 with the drill chuck and drill bit not shown to better emphasize the details of construction of the safety shield, but showing the lower end of the safety shield in near engagement with a workpiece to be drilled.

The top cylinder 32 is shown in FIG. 5 as a hollow cylindrical member of sheet metal which is fitted above its top end 36 with an enlarged split collar 38 that is joined to the top cylinder by a narrow connecting tab 40 that is positioned adjacent the front side of the safety shield as is best seen in the right side elevational view of FIG. 1. The enlarged split collar 38 is a vertical cylindrical member that is larger in diameter than the top cylinder 32, and its split 42, as seen in FIGS. 3 and 4, is generally opposite the narrow connecting tab 40 between the collar 38 and the top edge 36 of the top cylinder 32. Thus, the split 42 is at the back side of the safety shield 32, and this is best illustrated in FIG. 3 which is a rear elevational view of the safety shield taken on the line 3—3 of FIG. 2. The split 42 is formed by bending or folding the two free ends of the collar 38 so that they are arranged in closely spaced parallel planes 44 and 46 which are fastened together by a threaded bolt 48 having a lock nut 50. Thus, when the operator wishes to assemble this safety shield 30 to the drill housing 18 it is merely a matter of locating the safety shield under the drill chuck and raising the shield until the split collar 38 is in the proper position relative to the drill housing 18 and then by tightening the lock nut 50 of the split collar until the safety shield is firmly in place.

The lower cylinder 34, as best seen in FIG. 5, is also a hollow cylindrical member of sheet metal of vertical elongated shape, and it also is fitted with an enlarged collar 56 adjacent its top end 58. This lower collar 56 is about the same diameter as the split collar 38, although the lower cylinder is larger in diameter than the top cylinder so that the top cylinder 32 may descend down into the interior of the lower cylinder 34, as is best seen in FIG. 4. A horizontal circular flange 60 extends from the top edge of the lower cylinder 34 to the lower edge 62 of the collar 56.

The top split collar 38 is furnished with a pair of opposite tubular bearings 64 and 66 which are vertically arranged along the opposite sides of the split collar, generally midway between the tab 40 and the split 42 of the collar. Notice that the two bearings 64 and 66 do not extend above the top edge of the split collar 38.

The enlarged collar 56 of the lower cylinder 34 is likewise furnished with a pair of opposite tubular bearings 64' and 66' mounted vertically in alignment with the bearings 64 and 66 of the split collar respectively. Notice that the bearings 64' and 66' do not extend below the bottom edge 68 of the enlarged collar 56.

The purpose of the two pairs of vertically aligned bearings 64 and 64' and 66 and 66' is that each pair is adapted to receive an elongated slide pin 74. Each slide pin has an enlarged head 76 at the top end so that the slide pin will not slip down and out of the top bearings 64 and 66. Thus, in assembling the top cylinder 32 to the lower cylinder 34, it is merely necessary to center the top cylinder over the lower cylinder and to align the two slide pins 74 with the lower bearings 64' and 66', and then to allow the upper cylinder 32 to rest in place in this telescoped position. Notice that the two lower bearings 64' and 66' are each furnished with a setscrew 78 so that the lower cylinder 34 can be suspended from the upper cylinder 32 by means of the slide pins, where the setscrew 78 is tightened down so that the slide pins 74 and fixed in the lower bearing 64' and 66' while the slide pins are free to move up and down relative to the upper bearings 64 and 66. Notice in FIG. 3 that the heads 76 of the slide pins are supported from the top end of the top bearings 64 and 66.

Still looking at FIG. 5, the rear side of the lower cylinder 34 is open from top to bottom for gaining access to the interior of the lower cylinder, as is best seen in FIG. 3, so as to be able to manipulate the drill chuck 22 and install and remove the drill bit 24.

Notice in FIG. 5 that the lower end 82 of the lower cylinder 34 is furnished with a closed bottom wall 84, again for the protection of the operator. This bottom wall 84 is furnished with a small central opening 86 from which is supported a downwardly projecting tubular drill guide 88. The lower end 90 of this drill guide 88 is adapted to bear down on the workpiece 92, as is best seen in FIG. 4. Now, when the operator wishes to drill a hole in the workpiece, he will turn the handwheel 26, thus lowering the non-rotating, vertically movable drill housing 18 which carries the rotating spindle 20. Once the lower end 90 of the drill guide 88 touches the workpiece 92, the lower cylinder 34 cannot move downwardly any further, but the upper cylinder 32 can continue to move downwardly because it passes into the lower cylinder 34, as is clearly illustrated in FIG. 4, and the drill bit 24 passes entirely through the drill guide 88 and into the workpiece 92. Notice that once the lower end 90 of the drill guide 88 touches the workpiece 92, the upper cylinder 32 will tend to move into the lower cylinder 34, and this causes the upper split collar 38 to slide down the slide pin 74, as shown in FIG. 4.

Having described above a novel invention of a safety shield made according to the present invention, it will readily be apparent to those skilled in this art that the operator will be protected fro the rotating chuck and the rotating drill bit by the lower cylinder 34 and the drill guide 88. The operator will locate the setscrews 78 relative to the slide pins 74 such that the drill bit 24 is always within the lower cylinder 34 until the lower end 90 of the drill guide touches the workpiece 92. It is only then that the drill bit 24 can be lowered through the drill guide and into the workpiece. Thus, the operator is not able to inadvertently touch the drill bit extending out of the bottom of the drill guide 88 because the lower cylinder 34 is moved by gravity into the position as shown in FIG. 3 where the cutting tip of the drill bit 24 is clearly within the lower cylinder 34.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A collapsible shield for protecting an operator of a vertical drill press, said shield comprising:
    a. a pair of interconnected telescoping hollow cylinders, with a top cylinder of elongated shape adapted to be mounted to a non-rotating, vertically movable drill housing member, and a lower cylinder of elongated shape that is suspended from the top cylinder and is capable of vertical telescoping movement with respect to the top cylinder;
    b. the top cylinder being fitted above its top end with an enlarged split collar that is joined to the top cylinder by tab means remote from the said split so the collar may expand and contract, and fastening means assembled across the split of the collar for tightening and loosening the collar with respect to the said drill housing member;
    c. the lower cylinder being fitted with an enlarged collar adjacent its top end of about the same diameter as the said split collar, the lower cylinder being larger in diameter than the top cylinder so the lower cylinder may telescope over the top cylinder;
    d. a first pair of opposite tubular bearings each mounted vertically on the upper split collar, and a second pair of opposite tubular bearings each mounted vertically on the lower collar to be in vertical alignment with the said first pair, and a vertical elongated slide pin mounted between the aligned bearings of both collars, the top portion of each slide pin having an enlarged head, and the pins loosely fitted in the bearings of the top collar and fixed with respect to the bearings of the lower collar for suspending the lower cylinder from the top cylinder by means of these slide pins;
    e. one side of the lower cylinder being removed so that it is open for gaining access to the interior thereof, the bottom of the lower cylinder being closed by a wall that is furnished with a central opening supporting a downwardly projecting tubular drill guide.

2. The collapsible safely shield invention as is recited in claim 1 wherein the vertical tubular bearings of the collar of the lower cylinder have adjustable fastening means for clamping the respective slide pins present in these bearings for vertically positioning the lower cylinder relative to the upper cylinder.

3. The collapsible safety shield invention as is recited in claim 2 wherein both the split of the collar of the top cylinder and the open side of the lower cylinder are generally in vertical alignment with each other and arranged at the rear side of the drill when the drill is in use.

4. The collapsible safety shield invention as is recited in claim 3 wherein the vertical pair of opposite tubular bearings of the upper split collar are generally diametrically opposed and positioned generally intermediate the said tab means and the said split of the collar.

* * * * *